Figure 1:
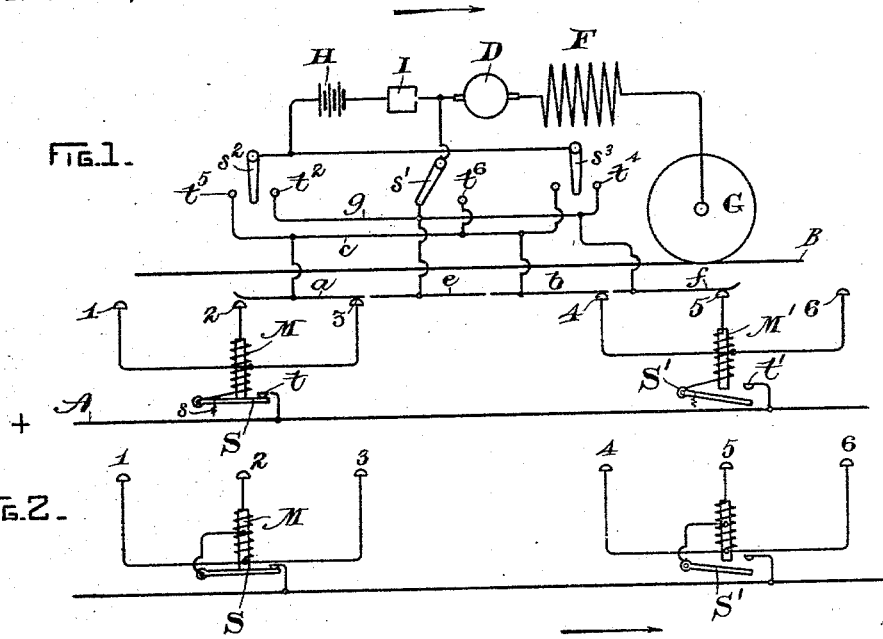

(No Model.) 2 Sheets—Sheet 1.

F. C. ESMOND.
CLOSED CONDUIT SYSTEM FOR ELECTRIC RAILWAYS.

No. 551,537. Patented Dec. 17, 1895.

WITNESSES.
A. F. Macdonald.
B. B. Hull.

INVENTOR—
Frederick C. Esmond
By Geo. R. Blodgett
Atty (No Model.) 2 Sheets—Sheet 2.

F. C. ESMOND.
CLOSED CONDUIT SYSTEM FOR ELECTRIC RAILWAYS.

No. 551,537. Patented Dec. 17, 1895.

WITNESSES—
A. F. Macdonald.
R. B. Hull

INVENTOR—
Frederick C. Esmond
By R. Blodgett
Atty.

UNITED STATES PATENT OFFICE.

FREDERICK C. ESMOND, OF BROOKLYN, NEW YORK, ASSIGNOR TO THE ESMOND ELECTRIC TRACTION COMPANY, OF WEST VIRGINIA.

CLOSED-CONDUIT SYSTEM FOR ELECTRIC RAILWAYS.

SPECIFICATION forming part of Letters Patent No. 551,537, dated December 17, 1895.

Application filed September 11, 1895. Serial No. 562,183. (No model.)

*To all whom it may concern:*

Be it known that I, FREDERICK C. ESMOND, a citizen of the United States, residing at Brooklyn, in the county of Kings and State of New York, have invented certain new and useful Improvements in Closed-Conduit Systems for Electric Railways, of which the following is a specification.

The present invention relates to closed-conduit systems for electric railways of the kind in which there are one or more insulated line conductors, and a series of exposed working-conductor sections or points normally disconnected from the line conductors, but coupled in circuit therewith through automatically-acting electromagnetic switches for supplying current to the motors on the traveling car.

The invention comprises a number of improvements in systems of this character, among which I mention as prominent—

First. A series of magnets for actuating the line-switches, whose windings are connected to the contacts or line conductor, or both, at an intermediate point, so as to reduce the ohmic losses in the magnet-coils and simplify their construction. This feature of the present invention can be used in a wide number of systems, some of which will be hereinafter described.

Second. It is already well known that the line-switches may be operated by throwing in advance conductor-sections by an arrangement of circuits such that the current from a given contact-point or set of points divides, one branch leading directly to the motor, and another branch in multiple passing through the magnet of an advance switch or set of switches. In this invention I so arrange the circuits that the current does not divide, but flows through the magnet of an advanced set of sections in series with the motor. This is a preferable construction for practical purposes.

Third. I show herein, as a part of my invention, a system in which the working contacts are divided into sets of three, and in order to simplify the line construction, as well as to insure complete insulation between different sets of sections, I provide a comparatively long space between each set of sections, equal or substantially equal to the distance which can be bridged by two of the collectors or two parts of a single collector, as herein described.

The invention also comprises other features, which will be hereinafter described, and referred to in the claims.

Figure 2:
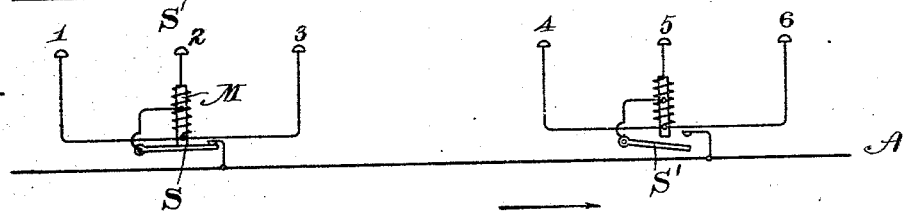
Figure 3:
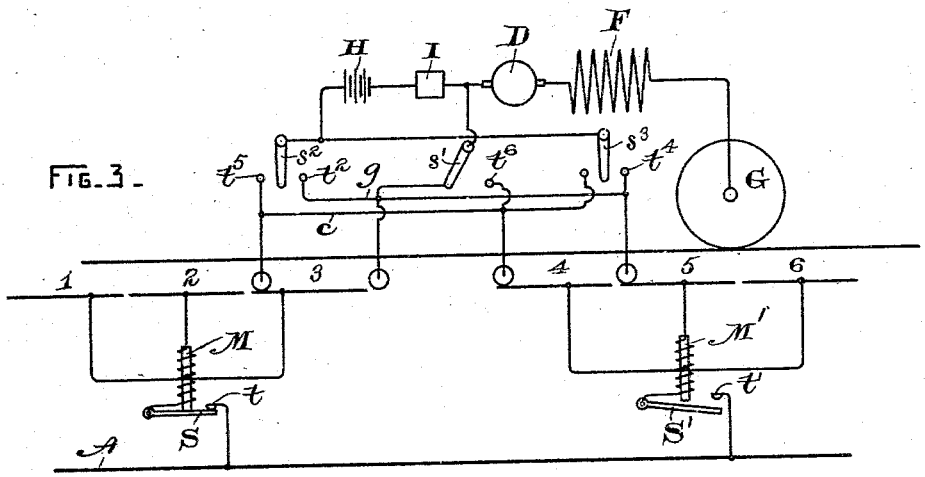
Figure 4:
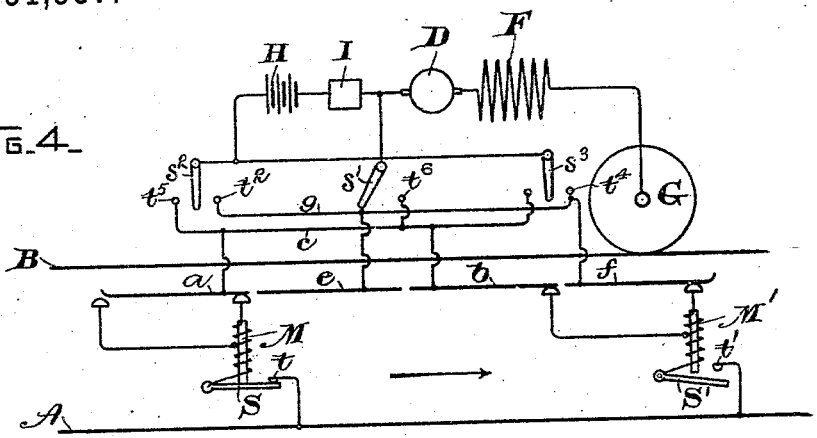
Figure 5:
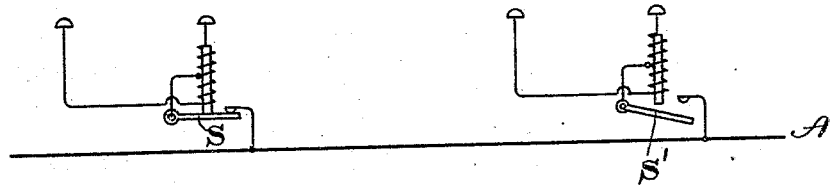
Figure 6:
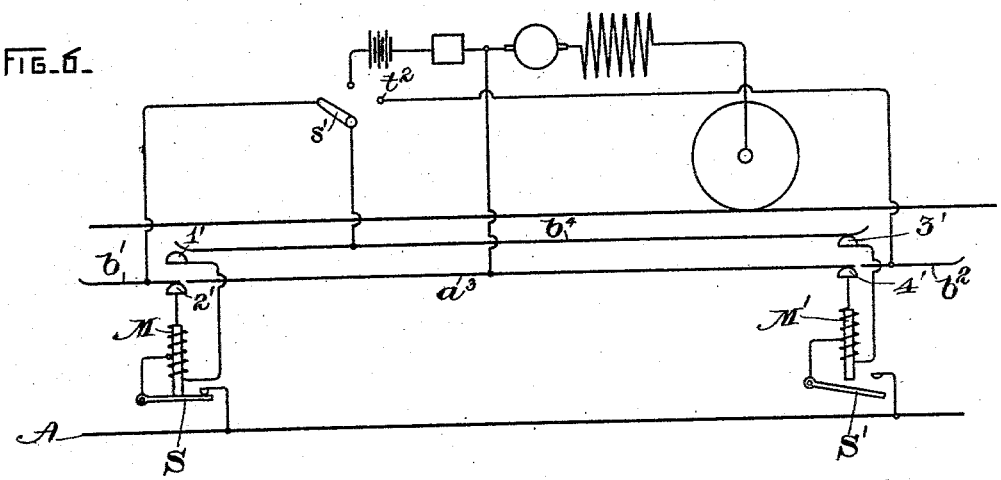

In the accompanying drawings, Figure 1 is a diagram of one form of the invention, and Fig. 2 a diagram of a similar form of the invention with the circuits somewhat changed. Fig. 3 is still a further modification. Fig. 4 is a diagram showing a different system, in which some of the features of the invention may be embodied; and Fig. 5, a modification. Fig. 6 is still a further modification.

Referring first to Fig. 1, A and B are the insulated line conductors. For the purpose of this description I will assume that A is the positive supply-conductor. It will be insulated and arranged along the track in any of the ways now well known in the art. The negative supply-conductor B may consist of a metallic wire or track-rails or bonded track-rails connected to a feeder in the manner now customary in the ordinary trolley system.

1 2 3 and 4 5 6 are the working conductor-sections, which are arranged in sets of three, as shown in the diagram.

S S' are switches which normally stand in an open position under the action of gravity or a spring $s$, but when closed make contact with the supply-conductor A through contact-points $t\ t'$.

M M' are electromagnets, one for each switch. The winding of each of these magnets is connected, as shown in the diagram, to the line-switch at one terminal, to one of the working contacts, as 2, at the other terminal, and at an intermediate point to the other working contacts of each set—as, for example, 1 3. The winding of magnet M' is similarly connected to the switch S' and to the contacts 4 5 6.

The motor or motors on the car are diagrammatically represented as comprising an armature D and field-coil F. One terminal of the motor is connected to the return-conductor B through the wheels of the car or a special contact device G. The positive terminal of the motor is maintained in circuit with the working contacts through overlapping collectors, comprising members $a$ $b$, which are electrically connected by the wire $c$, and a second set of parts $e$ $f$, connected by the wire $g$.

When the parts are in the position shown in the diagram, and with the car moving in the direction of the arrow, the switch S has been closed and current flows from the line conductor A, through the switch, a comparatively small portion of the winding of magnet M, the collector $a$, collector $b$, through a portion of the winding of magnet M', through the collector $f$, and to the positive terminal of the motor through a switch $s'$. A portion of the winding of magnet M' will therefore be included in series circuit with the motor so as to close switch S'. This switch, however, is shown open in the diagram for clearness of illustration. The switch S having once been closed little power is required to maintain it closed. Hence a comparatively few turns on magnet M are now in circuit, while a larger number of turns of magnet M' are in circuit so as to afford the greater power necessary for primarily closing this switch. For this reason I ordinarily tap the coils at a point about two-thirds of their length, so that the line-current collected from one set of sections has to pass only through a small number of turns, while each magnet is primarily energized by current passing through a larger number of turns. I do not, however, limit the invention to this special arrangement. By the time that the collector $a$ leaves the contact 3 the collector $e$ will have engaged the contact 4, so as to preserve the motor-circuit constant. It will thus be seen that for a substantial length of time the current has to pass from one of the rear sets of contacts in series through a portion of the winding of the magnet of an advanced set of contacts, when the rear set is disconnected and current is collected through the advance switch. In this way, as will be evident, the switches are successively thrown, and the motor-circuit is preserved constant.

A storage-battery or other source of current H is carried on the car, and is connected at one terminal to the positive motor-terminal through a resistance I. The other terminal of the battery is connected through switches $s^2$ $s^3$ with either set of collectors. The purpose of the battery is to pick up the switches at any time when it becomes necessary so to do. For example, assume that it is necessary to pick up the switch S' when the car stands in the position shown. The switch $s^2$ would then be thrown onto the contact $t^2$, and the switch $s'$ onto the contact $t^6$. The circuit would then be formed from the battery through the contact $t^2$, collector $f$, magnet M', collector $d$, contact $t^5$, and switch S'. At other times, when the car is moving in the opposite direction, a similar circuit would be formed by throwing the switch $s^3$ onto the contact $t^4$, and the switch S' onto the contact $t^6$.

If at any time it is desired to charge the battery from the line, this may be done, for example, by throwing the switch $s^2$ onto contact $t^5$, when the line-current would pass partly through the battery and partly through the magnet-circuit, as heretofore traced. If the car be moving in the opposite direction, a similar result would be secured by throwing the switch $s^3$ onto the contact $t^4$.

The two sets of line-contacts are separated, as shown in the drawings, by a substantial distance, approximately equal to that which would be bridged by two of the collecting parts. This secures good insulation, and saves also somewhat in the number of working contacts.

The system of Fig. 2 is very similar to that of Fig. 1, except that the line-switches S S' are connected to an intermediate point in the coils of the magnets, while two of the working contacts of each set are connected to one terminal of the magnet, and the third working contact to the other terminal. This will be readily understood from the drawings, as will also the mode of operation.

The system shown in Fig. 3 resembles that of Fig. 1, except that the working sections instead of being short points are made of rail-sections, and the collectors are formed of wheels or short brushes. The two systems resemble one another so closely that the mode of operation of the modification shown in Fig. 3 will be understood without explanation. The parts are lettered in the same way as in Fig. 1, and the car is shown in the corresponding position. For an ordinary twenty-four foot car in this system the rail-sections will be about three feet in length, or a little less, and the distance between adjacent sets of sections will be approximately equal to one rail-section.

In Fig. 4 there is shown a system where the switching-magnets are arranged so as to have the same function as in Fig. 1, but the line-contacts are disposed in sets of two each. With the parts in the position shown, the circuit extends from the positive conductor A, through the magnet M, collector $a$, collector $b$, through a portion of the magnet M', collector $f$, switch $s'$, through the motor and through the return-conductor B. A portion of the winding of magnet M' is now in series with the motor, and will close the switch S'. In this modification the line-current will, however, have to pass through the entire winding of one of the magnets for a greater proportion of the time than in the system of Fig. 1, and I regard the system of Fig. 1 as a preferable one. The arrangement of the storage-battery and the collectors is substantially the same as has been already described. In Fig. 5 a similar system is shown, except that the switches S S' are connected to an intermediate point in the coils of the magnet, the terminals of the magnets being connected to the contacts. In this case the normal line-current will pass through only a fraction of the magnet, while the current actuating the switch will pass through the entire coil. In this particular the arrangement is the reverse of that of Fig. 4. In Fig. 6 I show how this feature of the invention can be embodied in a somewhat different system. Here the contacts are arranged in pairs, one opposite another, instead of being disposed one after the other along the road-bed, as in Figs. 4 and 5. The contacts of each pair are connected to the terminals of the magnets M M', and the switches S S' lead to an intermediate point in the coils. The arrangement of the collectors is also somewhat modified. A long collector $a^3$, which will bridge the distance between two sets of contacts, is connected to the positive motor-terminal and is adapted to engage one set of contacts, as 2' and 4'. Another collector $b^4$ engages the contacts 1' 3', and normally will be connected through a switch to one or the other of two accessory collectors $b'$ $b^2$, which are arranged in line with collector $a^3$, but separated therefrom by insulating-breaks. With the parts in the position shown current will pass from the line-conductor A, through the collector $a^3$, to the motor so long as the collector $a^3$ preserves contact with the contact-point 2'. When, however, the collector $a^3$ leaves this contact, current then passes from the contact 2' to the collector $b'$, collector $b^4$, contact 3', a portion of magnet M' and collector $a^3$ to the motor, thus throwing the advance magnet in series with the motor-circuit. When the car travels in the opposite direction the switch $s'$ will be thrown onto the contact $t^2$, and a similar circuit for actuating the line-switches will be formed, as will be understood.

Having thus described my invention, what I claim as new, and desire to secure by Letters Patent of the United States, is—

1. The combination of an insulated supply conductor, a series of working contact sections normally disconnected from the supply conductor, a series of switches for connecting the contact sections with the supply conductor, and a series of electro magnets for operating the switches whose coils are connected at an intermediate point in such manner as to form a path for current through only a portion of the magnet coils, as set forth.

2. The combination of an insulated supply conductor, a series of working contact sections, a series of switches for connecting the working sections with the supply conductor, a series of electro magnets for operating the switches, and collectors on the car arranged to include the magnet of an advanced section or set of sections in series between a rear section and the motor, closing successively the different switches, as set forth.

3. The combination of an insulated line conductor, a series of working contact sections normally disconnected from the line conductor, switches for connecting the line conductor and working sections, electro magnets for operating the switches having coils which are connected at an intermediate point to the contact sections, of switches and collectors on the car arranged to establish a circuit through the magnet of an advanced section, or set of sections, in series with the motor of the car and a rear section, as set forth.

4. The combination of an insulated supply conductor, a series of collectors on the car, and a series of working conductor sections divided into sets of three and arranged along the line of travel, with a space between each set substantially equal to the distance which can be bridged by two of the collectors, as set forth.

5. The combination of an insulated line conductor, working conductor sections divided into sets of three, a switching arrangement for connecting each set of working sections with the line conductor, and electro magnets for operating the switches whose coils are so connected at an intermediate point to the working sections that the line current passes through only a portion of the coil, as set forth.

6. The combination of an insulated supply conductor, a series of working conductor sections normally disconnected from the supply conductor, switches for connecting the working sections with the supply conductor, and electro-magnets for operating the switches, whose coils are connected at an intermediate point, as described, and collectors on the car so arranged as to establish successively a circuit in series with the motor through the magnets for actuating an advance switch, and for including only a portion of the coils in the line circuit for holding the switches closed when they have been once thrown.

7. The combination of a supply conductor, a series of insulated working conductor sections, switches for connecting the supply conductor and sections, magnets for operating the switches, collectors establishing a circuit through the magnets in series between the line and motor for operating the switches, and a battery on the car connected in multiple with the line circuit through one of the magnets.

8. The combination of a supply conductor, a series of insulated working conductor sections, switches for connecting the supply conductor and working sections, collectors on the car establishing a circuit through the magnets in series between the line and motor for operating the switches, a storage battery on the car, and switches on the car for connecting the battery so as to place the battery in a shunt circuit, shunting the line circuit through one of the magnets for a given direction of travel, and shunting a second magnet for the reverse direction of travel.

In witness whereof I have hereunto set my hand this 16th day of August, 1895.

FREDERICK C. ESMOND.

Witnesses:
B. B. HULL,
H. KUSTEREY.